United States Patent [19]

Epperly et al.

[11] Patent Number: 4,873,066
[45] Date of Patent: Oct. 10, 1989

[54] LOW TEMPERATURE PROCESS FOR THE REDUCTION OF NITRGEN OXIDES IN AN EFFLUENT

[75] Inventors: William R. Epperly, New Canaan; James C. Sullivan, Norwalk; Barry N. Sprague, Bethlehem, all of Conn.

[73] Assignee: Fuel Tech, Inc., Stamford, Conn.

[21] Appl. No.: 308,255

[22] Filed: Feb. 8, 1989

Related U.S. Application Data

[63] Continuation-in-part of Ser. No. 207,382, Jun. 15, 1988, which is a continuation-in-part of Ser. No. 50,198, May 14, 1987, Pat. No. 4,780,289, and a continuation-in-part of Ser. No. 90,962, Aug. 28, 1987, abandoned, and a continuation-in-part of Ser. No. 207,292, Jun. 15, 1988, Pat. No. 4,863,704, which is a continuation-in-part of Ser. No. 22,716, Mar. 6, 1987, Pat. No. 4,777,024, and a continuation-in-part of Ser. No. 90,962, Aug. 28, 1987, abandoned.

[51] Int. Cl.$^4$ ............................................. C01B 21/00
[52] U.S. Cl. .................................................... 423/235
[58] Field of Search .......................... 423/235, 235 D

[56] References Cited

U.S. PATENT DOCUMENTS 3,900,554  8/1975  Lyon ................................... 423/235
4,507,269  3/1985  Dean et al. ........................... 423/235
4,624,840  11/1986  Dean et al. ........................... 423/235

FOREIGN PATENT DOCUMENTS 2630202   2/1977   Fed. Rep. of Germany .
2813520   10/1978  Fed. Rep. of Germany .
4775945   3/1974   Japan .
50-67669  12/1976  Japan .
51-1138   7/1977   Japan .
51-4588   7/1977   Japan .
51-12330  8/1977   Japan .
51-89176  2/1978   Japan .
53-30975  3/1978   Japan .
53-128023 11/1978  Japan .
54-119370 9/1979   Japan ................................. 423/235
54-158371 12/1979  Japan .

Primary Examiner—Gregory A. Heller
Attorney, Agent, or Firm—St. Onge Steward Johnston & Reens

[57] ABSTRACT

A process is presented for the reduction of nitrogen oxides in the effluent from the combustion of a carbonaceous fuel. The process comprises introducing a treatment agent which comprises an ammonium salt selected from the group consisting of triammonium citrate and ammonium formate into an effluent at an effluent temperature of below 1300° F.

10 Claims, No Drawings

LOW TEMPERATURE PROCESS FOR THE REDUCTION OF NITRGEN OXIDES IN AN EFFLUENT

RELATED APPLICATIONS

This application is a continuation-in-part of copending and commonly assigned U.S. patent application entitled "Process for Nitrogen Oxides Reduction With Minimization of the Production of Other Pollutants", having Ser. No. 07/207,382, filed in the names of Epperly, O'Leary, Sullivan and Sprague on June 15, 1988, which in turn is a continuation-in-part of copending and commonly assigned U.S. patent application having Ser. No. 07/050,198, entitled "Process for Nitrogen Oxides Reduction and Minimization of the Production of Other Pollutants" filed in the names of Epperly, O'Leary and Sullivan on May 14, 1987, now U.S. Pat. No. 4,780,289, and copending and commonly assigned U.S. patent application having Ser. No. 07/090,962, entitled "Process for the Reduction of Nitrogen Oxides in an Effluent" filed in the names of Epperly, Sullivan and Sprague on Aug. 28, 1987, now abandoned; and copending and commonly assigned U.S. patent application entitled "Multi-Stage Process for Reducing the Concentration of Pollutants in an Effluent Using an Ammonium Salt", having Ser. No. 07/207,292, filed in the names of Epperly, Peter-Hoblyn, Shulof, Jr., Sullivan and Sprague on June 15, 1988, now U.S. Pat. No. 4,863,704, which in turn is a continuation-in-part of copending and commonly assigned U.S. patent application having Ser. No. 07/022,716, entitled "Multi-Stage Process for Reducing the Concentration of Pollutants in an Effluent" filed in the names of Epperly, Peter-Hoblyn, Shulof, Jr. and Sullivan on Mar. 6, 1987, now U.S. Pat. No. 4,777,024, and copending and commonly assigned U.S. patent application having Ser. No. 07/090,962, entitled "Process for the Reduction of Nitrogen Oxides in an Effluent" filed in the names if Epperly, Sullivan and Sprague on Aug. 28, 1987, now abandoned. The disclosures of each of these parent applications are incorporated herein by reference.

TECHNICAL FIELD

The present invention relates to a process for the reduction of nitrogen oxides ($NO_x$) in the effluent, especially the oxygen-rich effluent, from the combustion of a carbonaceous fuel by introduction of a treatment agent comprising an ammonium salt selected from the group consisting of triammonium citrate and ammonium formate into the effluent at effluent temperatures below 1300° F.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F., and typically about 2200° F. to about 3000° F., are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. In diesel engines, the operating temperatures of 2500° F. to 3000° F. are often found, which can lead to the formation of $NO_x$. Nitrogen oxides can form even in circulating fluidized bed boilers which operate at temperatures which typically range from 1300° F. to 1700° F.

Nitrogen oxides, especially $NO_2$, are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a major portion of acid rain.

Unfortunately, the temperatures and their distribution within a utility or circulating fluidized bed boiler render most common methods of reducing $NO_x$ concentrations, such as effluent scrubbing or catalyst grids, either uneconomical, infeasible, or both.

BACKGROUND ART

Various methods and compositions for reducing the $NO_x$ concentration in the effluent from the combustion of a carbonaceous fuel have been proposed. For instance, Lyon, in U.S. Pat. No. 3,900,554, discloses the introduction of ammonia, as a pure substance or in the form of ammonium formate, ammonium oxalate or ammonium carbonate, into effluents at temperatures between 1300° F. and 2000° F. For operation at temperatures below 1600° F., the use of reducing materials such as paraffinic, olefinic, aromatic and oxygenated hydrocarbons, as well as carbon monoxide and hydrogen, are required. Arand et al., in U.S. Pat. No. 4,208,386, disclose a method for reducing $NO_x$ in the combustion effluents by introducing urea, either as a solid powder or in solution, at effluent temperatures in excess of 1300° F., also like Lyon with ancillary reducing materials at the lower temperatures. The preferred urea solutions according to Arand et al. are those having at least 10 weight percent urea.

Bowers, in U.S. Pat. No. 4,751,065, discloses the use of a solution which comprises urea and hexamethylenetetramine (HMTA) to reduce the $NO_x$ concentration in oxygen-rich effluents having temperatures above 1300° F. Similarly, Bowers, in U.S. Pat. No. 4,719,092, discloses a solution comprising urea and an oxygenated hydrocarbon solvent which is disclosed as being effective at reducing $NO_x$ concentrations with reduced ammonia slippage in effluents at temperatures above 1600° F.

Although the prior art processes for reducing nitrogen oxides concentrations are generally effective, there exists a present need for a process which elicits still further $NO_x$ reductions in an economical and convenient manner, especially over a broad range of effluent temperatures.

DISCLOSURE OF INVENTION

The present invention relates to a process for reducing nitrogen oxides in the effluent from the combustion of a carbonaceous fuel. More particularly, the present ivention relates to a process which comprises introducing into the effluent from the combustion of a carbonaceous fuel a treatment agent comprising an ammonium salt selected from the group consisting of triammonium citrate and ammonium formate at an effluent temperature below 1300° F., and preferably below about 1250° F.

BEST MODE FOR CARRYING OUT THE INVENTION

For the purposes of this description, all temperatures herein are measured using an unshielded K-type thermocouple. Unless otherwise indicated, all parts and percentages are based on the weight of the composition at the particular point of reference.

The term "ammonium salt" refers to salts which can be formed by the neutralization of ammonium hydroxide with an organic acid, preferably a carboxylic acid (i.e., an acid having one or more carboxyl (COOH) groups). If the acid has more than one carboxylate group, they may be partially or completely neutralized by ammonium hydroxide.

Advantageously, the ammonium salt of this invention is selected from the group consisting of triammonium citrate (the ammonium salt of citric acid) and ammonium formate (the ammonium salt of formic acid). It has surprisingly been found that these ammonium salts have the ability to reduce nitrogen oxides at temperatures below 1300° F., especially below 1200° F. without the generation of substantial amounts of secondary pollutants such as ammonia. It had previously been believed that nitrogenous $NO_x$ reducing treatment agents were not able to achieve significant reductions of nitrogen oxides at such low temperatures without the generation of secondary pollutants.

Advantageously, the treatment agent of this invention is introduced into the effluent in solution or as a dispersion or mixture in a suitable carrier or solvent. Water is a preferred carrier or solvent due to the solubility of the ammonium salts of this invention and also due to the economy of aqueous solutions, dispersions and mixtures and the fact that they can be employed with suitable effectiveness in most situations. For the ease of description, the term "mixture" will be used to denote mixtures, dispersions and solutions. The effective mixture comprising the treatment agent of this invention will range from saturated to dilute. While water is an effective carrier or solvent for most applications, it will be recognized that there may be instances where other solvents may be advantageously used, either alone or in combination with water, as would be known to the skilled artisan.

The level of the ammonium salt present in the mixture is preferably in the range of about 0.5% to about 50% by weight, most preferably about 5% to about 35% by weight. The temperature of the effluent at the point of introduction will have an influence on the concentration of the mixture. At lower temperatures (i.e., below about 1200° F.), the mixture will tend to operate effectively at high concentration, e.g., about 10% to about 50% by weight treatment agent. On the other hand, at higher temperatures (i.e., between about 1200° F. and 1300° F.), the mixture will tend more towards dilute.

The treatment agent of this invention is preferably introduced into the effluent in an amount effective to elicit a reduction in the nitrogen oxides concentration in the effluent. Advantageously, the treatment agent of this invention is introduced into the effluent in an amount sufficient to provide a molar ratio of the nitrogen contained in the ammonium salt which comprises the treatment agent to the baseline nitrogen oxides level (by which is meant the level of nitrogen oxides existing in the effluent prior to treatment according to the method of the present invention) of about 1:5 to about 10:1. More preferably, the treatment agent is introduced into the effluent to provide a molar ratio of treatment agent nitrogen to baseline nitrogen oxides level of about 1:3 to about 5:1, most preferably about 1:2 to about 3:1.

The treatment agent, whether in a mixture or introduced in pure form, is introduced into the effluent gas stream at a point where the effluent is at a temperature below 1300° F., preferably below about 1250° F. and more preferably below about 1200° F. Large industrial and circulating fluidized bed boilers of the types employed for utility power plants and other large facilities will typically have access only at limited points. In the most typical situations, the boiler interior in the area above the flame operates at temperatures which at full load approach 1900° F., even 2000° F. In the case of gas turbines, the effluent temperature may be about 900° F. to about 1600° F. After subsequent heat exchange, the temperature will be lower, usually down to temperatures as low as 1300° F. and lower. In diesel engines, the exhaust temperature is in the range of about 900° F. to about 1300° F. At these temperatures, the treatment agent of this invention can be effectively introduced to accomplish substantial reduction of nitrogen oxides in the effluent.

The availability of a process for reducing the nitrogen oxides concentration in an effluent which is at temperatures below 1300° F. and, especially, below about 1200° F., is desirable because access to the effluent stream of a large industrial boiler at a location where the temperature is above 1300° F. is not always practical due to boiler configuration and other considerations. Moreover, even where access to the effluent stream of a boiler is possible at such higher temperatures, it is often highly desirable to utilize a treatment agent which will reduce $NO_x$ concentrations at the temperatures at which the ammonium salt of this invention can operate to achieve further nitrogen oxides reductions and also to minimize the production of other pollutants, as will be discussed in more detail below. Also, gas turbine exhaust is usually available at a lower temperature, i.e., about 900° F. to about 1600° F., and treatment below 1300° F. may be essential to achieving target nitrogen oxides reductions. Finally, as noted above, diesel exhaust is usually available at about 900° F. to about 1300° F.

The treatment agent utilized according to this invention is preferably introduced at a number of spaced positions from nozzles or other apparatus which are effective to uniformly distribute the treatment agent through the combustion effluent.

The effluent into which the treatment agent of this invention is introduced is preferably oxygen-rich, meaning that these is a stoichiometric excess of oxygen in the effluent. Advantageously, the excess of oxygen is greater than about 1% by volume. More preferably, the excess of oxygen is in the range of about 1% to about 20% or greater by volume, most preferably about 1% to about 11% by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of other, residual pollutants such as ammonia and/or carbon monoxide. Such a suitable "multi-step" process is disclosed in U.S. Pat. No. 4,777,024 as well as in copending and commonly assigned U.S. patent application entitled "Multi-Stage Process for Reducing the Concentration of Pollutants in an Effluent Using an Ammonium Salt" filed in the names of Epperly, Peter-Hoblyn, Shulof, Jr., Sullivan and Sprague on June 15, 1988 and assigned Ser. No. 07/207,292, the disclosures of which are incorporated herein by reference.

A further advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3$ to form ammonium bisulfatee which can foul heat exchange surfaces in a boiler. Moreover, ammonia has detrimental effects on ambient air quality, as has carbon monoxide. Such lower levels of the production of other pollutants such as ammonia and carbon monoxide can most effectively be achieved by introducing the treatment agents of this invention on the right side of their nitrogen oxides reduction versus effluent temperature curve, especially on the right side of the curve plateau. This process is fully explained and taught in U.S. Pat. No. 4,780,289 as well as copending and commonly assigned U.S. patent application Ser. No. 07/207,382, entitled "Process for Nitrogen Oxides Reduction With Minimization of the Production of Other Pollutants", filed June 15, 1988 in the names of Epperly, O'Leary, Sullivan and Sprague, the disclosures of which are incorporated herein by reference. The breadth of the nitrogen oxides reduction versus effluent temperature curve of the treatment agent of this invention thus allows greater flexibility when practiced along with the inventions disclosed in the Epperly et al. patent and patent application.

The following examples further illustrate and explain the invention by detailing the operation of a treatment agent comprising an ammonium salt selected from the group consisting of triammonium citrate and ammonium formate in the reduction of nitrogen oxides emissions in a combustion effluent.

EXAMPLE Ia

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of introduction utilizing a K-type thermocouple. Atomizing injectors described in copending and commonly assigned U.S. patent application entitled "Process and Apparatus for Reducing the Concentration of Pollutants in an Effluent" having Ser. No. 07/009,696, filed in the name of Burton on Feb. 2, 1987, the disclosure of which is incorporated herein by reference, are positioned through ports in the effluent flue conduit in order to introduce and distribute the treatment agents into the effluent stream. The agents are introduced into the effluent at a rate of 300 to 338 ml/hr. The burner fuel is a Number 2 fuel oil, and the burner is fired at a rate of 5.0 lbs/hr to 6.5 lbs/hr. to achieve the desired temperature.

A baseline nitrogen oxides concentration reading is taken prior to beginning each run to calculate the introduction ratio of treatment agent to baseline nitrogen oxides and a final nitrogen oxides reading is taken during and downstream from introduction of the treatment agents to calculate the reduction in the nitrogen oxides concentration in the effluent elicited by each of the treatment agents injected. Additionally, ammonia readings are taken during and downstream from introduction of the treatment agents to measure the production of other pollutants.

The treatment agent introduced is an aqueous solution which comprises 10% by weight of ammonium salt. The particular treatment agent, introduction temperature, % excess oxygen, baseline $NO_x$, final $NO_x$ and % reduction of $NO_x$ for each run is set out in Table 1a.

TABLE 1a

| Ammonium Salt | Temp. (°F.) | % $O_2$ | $NO_x$ Baseline | (ppm) Final | % Red. | $NH_3$ (ppm) |
|---|---|---|---|---|---|---|
| Triammonium Citrate | 1125 | 6.6 | 112 | 97 | 13.4 | 1.1 |
| Triammonium Citrate | 1130 | 7.0 | 105 | 84 | 20.0 | 0.0 |
| Ammonium Formate | 1130 | 7.2 | 105 | 93 | 11.4 | 0.0 |
| Triammonium Citrate | 1135 | 7.1 | 104 | 92 | 11.5 | — |
| Triammonium Citrate | 1140 | 7.2 | 105 | 86 | 18.1 | 0.4 |
| Triammonium Citrate | 1150 | 10.5 | 76 | 52 | 31.6 | 1.4 |
| Ammonium Formate | 1155 | 10.0 | 76 | 51 | 32.9 | 0.5 |
| Triammonium Citrate | 1175 | 10.0 | 70 | 59 | 15.7 | — |
| Ammonium Formate | 1195 | 10.0 | 69 | 47 | 31.9 | — |
| Ammonium Formate | 1205 | 9.5 | 79 | 52 | 34.2 | — |
| Triammonium Citrate | 1210 | 9.5 | 78 | 55 | 29.5 | — |

EXAMPLE Ib

The procedure of Example Ia is repeated, except the ammonium salts used as treatment agents are other than those claimed herein. The results are set out in Table 1b.

TABLE 1b

| Ammonium Salt | Temp. (°F.) | % $O_2$ | $NO_x$ Baseline | (ppm) Final | % Red. | $NH_3$ (ppm) |
|---|---|---|---|---|---|---|
| Ammonium Glycolate | 1125 | 6.6 | 112 | 109 | 2.7 | 1.0 |
| Ammonium Acetate | 1140 | 7.2 | 105 | 106 | 0.0 | 0.0 |
| Ammonium Carbonate | 1140 | 7.0 | 110 | 118 | 0.0 | 0.9 |
| Ammonium Acetate | 1165 | 10.0 | 66 | 66 | 0.0 | — |
| Ammonium Carbamate | 1180 | 10.0 | 69 | 67 | 2.9 | — |
| Ammonium Benzoate | 1180 | 10.0 | 70 | 66 | 5.7 | — |
| Ammonium Oxalate | 1135 | 7.0 | 109 | 106 | 2.8 | 0.7 |

It will be seen with reference to Tables 1a and 1b that the ammonium salts of the present invention are able to achieve substantial reductions in nitrogen oxides levels without the generation of ammonia at temperatures significantly below 1300° F., and even significantly below 1200° F., unlike other ammonium salts.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the effluent from the combustion of a carbonaceous fuel, the process comprising introducing a treatment agent which comprises an ammonium salt selected from the group consisting of triammonium citrate and ammonium formate into the effluent at an effluent temperature below 1300° F.

2. The process of claim 1 wherein the temperature of the effluent is below about 1200° F.

3. The process of claim 2 wherein the temperature of the effluent is at least about 900° F.

4. The process of claim 1 wherein said treatment agent is introduced into the effluent at a molar ratio of the nitrogen contained in said treatment agent to the baseline nitrogen oxides level of 1:5 to about 10:1.

5. The process of claim 4 wherein the molar ratio of treatment agent nitrogen to the baseline nitrogen oxides level is about 1:3 to about 5:1.

6. The process of claim 1 wherein said treatment agent is in solution, in a mixture or in a dispersion.

7. The process of claim 6 wherein said treatment agent is in aqueous solution.

8. The process of claim 6 wherein said ammonium salt is present in said solution, mixture or dispersion in an amount of about 0.5% to about 50% by weight.

9. The process of claim 1 wherein the effluent comprises an excess of oxygen.

10. The process of claim 9 wherein the effluent has an excess of oxygen of no greater than about 20% by volume.

* * * * *

UNITED STATES PATENT AND TRADEMARK OFFICE
CERTIFICATE OF CORRECTION

PATENT NO. : 4,873,066

DATED : October 10, 1989

INVENTOR(S) : Epperly, Sullivan and Sprague

It is certified that error appears in the above—identified patent and that said Letters Patent is hereby corrected as shown below:

Title page, item [54]; line 2: "NITRGEN" should read --NITROGEN--.

Signed and Sealed this

Fourth Day of August, 1992

Attest:

DOUGLAS B. COMER

*Attesting Officer*    Acting Commissioner of Patents and Trademarks